United States Patent Office 2,784,098
Patented Mar. 5, 1957

2,784,098

IMPROVED TROUGH GREASE AND METHOD OF PREPARING THE SAME

Jarvis B. Beverly, Valparaiso, Ind., assignor to Standard Oil Company, Chicago, Ill., a corporation of Indiana No Drawing. Application June 2, 1952,
Serial No. 291,315

4 Claims. (Cl. 99—118)

This invention relates to improved trough greases; more specifically it relates to novel compositions comprising petroleum waxes and oil which are particularly suitable for use in the baking industry.

Trough greases are compositions which are used extensively for greasing pans in commercial baking operations. Lard and various vegetable fats have been employed for many years for this purpose. Recently it has been found that compositions derived from petroleum are cheaper and more chemically stable and can be employed for this purpose with outstanding results. Since such greases come in contact with and may be partially absorbed by food, it is important that the components thereof be of high purity. Thus, the components should meet U. S. Pharmacapoeia requirements and the mixture should be free from adulterants. Furthermore, these greases should be characterized by a pleasing gloss, they should be smooth and not grainy, they should be tasteless and odorless even after prolonged storage, they should meet the necessary requirements of boiling range, viscosity, softness, penetration melting point, etc., they should be resistant to syneresis, i. e., they should not bleed or permit any oil separation even after prolonged storage at temperatures of the order of 90° F. and because these substances are employed as substitutes for various animal and vegetable derived products having a certain characteristic whiteness and generally fatty appearance, it has been found highly desirable that products derived from petroleum simulate the previously employed products in this respect. It is the primary object of the present invention, therefore, to provide an improved petroleum trough grease composition which will satisfy all of the above requirements. Other objects will be apparent as the detailed description of the invention proceeds.

It has been discovered that a novel blend of microcrystalline wax (derived from petrolatum), paraffin wax, and mineral white oil, when emulsified with a relatively small amount of water, produces a trough grease which is outstanding in all respects. Such a product has high stability, does not bleed, even after extended storage at relatively high temperatures, and has an appearance substantially the same as commonly employed animal or vegetable fats such as lard or shortening. Thus, in accordance with the present invention, outstanding petroleum trough greases may be prepared by blending an amount of from about 15% to 25% by volume of a microcrystalline wax with from about 1% to about 15% by volume of a paraffin wax and from about 60% to about 80% by volume of a mineral white oil and emulsifying such blend with from 1% to 15% by volume of water. The ratio of microcrystalline wax to paraffin wax in such grease should be at least 2:1 and preferably at least about 3:1. It is preferred to employ a small quantity of emulsifying agent for the purpose of obtaining the desired emulsion, but stable emulsions can be obtained without same if suitable mixing equipment is available. Because of purity requirements, it is necessary, in accordance with the preferred embodiment hereof, that an edible, nontoxic emulsifier be employed.

The microcrystalline wax suitable for use in accordance with the preferred embodiment of the present invention should be free of oil but may, as a practical matter, have certain amounts of retained oil; it may have a melting point in the range of from about 120° F. to about 200° F. and preferably in the range of from about 140° F. to about 160° F. Microcrystalline waxes of this type are derived from crude petroleum by distilling the crude to remove components boiling up to and including motor oil distillate (i. e., components boiling up to approximately 1,000° F.) after which the undistilled portion which is called the reduced crude is subjected to fractionation by deasphalting and/or deresining steps to remove asphalts and resins and give a so-called "steam refined lube stock" or cylinder stock, as it is sometimes referred to. This steam refined lube stock is then relatively lightly acid treated and dewaxed to obtain a so-called bright stock and crude petroleum base, respectively. The crude petrolatum base still ordinarily contains excessive amounts of oil and color bodies and it is, therefore, substantially or completely deoiled, e. g., by multiple washing and recrystallization from petroleum solvents. (Heavier acid treats of the steam refined lube stock would, of course, improve the color but such tends to be uneconomical in refinery practice because of high oil loss, etc.) The resulting substantially oil-free microcrystalline wax is then ordinarily subjected to a final color improvement by clay percolation. Owing to the fact that many refineries do not find it economical to remove the last small percentage of oil from the wax, and do not, therefore, have pure microcrystalline wax available, a highly refined white petrolatum containing as much as about 15% to 20% of oil, but preferably not more than about 5% to 10% by volume, may be employed in accordance with the present invention. In such case, the quantity of white oil added to prepare the final composition should be reduced relatively so as not to exceed a maximum oil content of the trough grease of about 85% by volume. It is preferred, however, to employ a substantially oil-free microcrystalline wax, i. e. less than about 2% by volume. Based upon substantially oil-free microcrystalline wax, the grease should comprise an amount from about 15% to about 30% and preferably from about 18% to about 25% by volume of that material.

The petroleum derived paraffin wax which may be employed in accordance with the present invention, should have a melting point of at least about 118° F. but no higher than about 140° F. and preferably from about 120° F. to 130° F. The paraffin wax employed should be highly refined and decolorized. Paraffin wax is employed for the principal purpose of giving greater body and firmness to the product and should be employed in an amount of from about 1% to about 15% by volume and preferably in an amount of from about 4% to about 10%. In accordance with the present invention, the ratio of microcrystalline wax to paraffin wax should be at least 2:1 and preferably at least about 3:1 in order to obtain a product suitable for use as a trough grease.

The mineral white oil suitable for use in accordance herewith should be of highest purity and as substantially colorless. It is preferred to use the so-called medicinal or cosmetic oils, which are highly refined mineral oils having a viscosity of from about 56 to about 350 seconds Saybolt at 100° F. Such white oils commonly contain an additive which meets U. S. P. requirements, e. g. tocopherol (vitamin E), to impart antioxidant properties thereto. It is desirable that such an antioxidant be present in the trough greases of the present invention but it is not essential. The mineral white oil should comprise an amount of from about 60% to 85% by volume and preferably from about 70% to 80% by volume of the total grease.

As indicated above, an amount of from about 1% to about 15% by volume of water and preferably from about 3% to 10% is emulsified with the oil, petrolatum and paraffin wax mixture. As an emulsifier useful in the preparation of stable emulsions of this type may be employed any edible, non-toxic material. For example: sorbitan sesquioleate, and other fatty acid derivatives of sorbitan such as the monolaurate, monopalmitate, monostearate, tristearate, monooleate, trioleate, etc., as well as any other suitable surface active material which would not contribute disadvantageously to the purity of the product. An amount of from about 0.005 to 0.5 part by volume and preferably from about 0.01 part by about 0.2 part by volume of surface active material may be employed.

In order to obtain emulsification of the grease components, it is necessary that they be in the liquid state. Thus, the emulsion must be prepared at a temperature at which the normally solid waxes are molten. Such temperature should preferably be as low as the requirement for liquefaction of the waxes can be satisfied because it has been demonstrated that the lower the temperature during such emulsification the more stable the ultimate emulsified grease. In this regard the emulsion temperature employed need not be quite as high as the melting point of the microcrystalline wax for the heat of the oil is usually sufficient to maintain the substantially lesser quantity of wax liquid during agitation. Greases prepared at temperatures of from about 150° F. to about 160° F. containing microcrystalline waxes melting at about 160° F. have exhibited complete stability at temperatures in the range of from −30° F. to about 210° F. At temperatures approaching the boiling point of water, the emulsions have been stable until substantially all of the water has been driven off. Emulsified grease products prepared from the same components by emulsification at temperatures as high as about 210° F. were unstable with separation of water from petroleum products occurring at a temperature as low as 180° F.

As an example of the trough greases which may be prepared in accordance with the present invention, a mixture comprising 20 parts by volume of a white petrolatum containing about 10% residual oil and having a melting point range of from about 150° F. to 160° F., 5 parts of refined paraffin was melting from 122° F. to 124° F., 75 parts of a highly refined white mineral oil having a viscosity at 100° F. of 95 to 100 S. S. U., 0.01 part of sorbitan sesquioleate (Arlacel C, product of Atlas Powder Co.) and 5 parts of water was heated to about 160° F. at which temperature the constituents were all in the liquid state, and emulsified by mixing vigorously for 5 minutes in a very high speed mixer. The product was a smooth textured, snow-white trough grease which melted at 131° F., had a penetration of 199 mm./10 at 77° F. by the ASTM D217-48 method and a Sonneborn bleeding number of 25.

Percentages and ratios given in the appended claims are on a volume basis unless otherwise specified.

Having thus described my invention what I claim as novel and desire to protect by Letters Patent, is as follows:

1. An emulsified trough grease composition which is opaque, high-melting and stable at high ambient temperatures comprising an amount of from about 1% to about 15% of a paraffin wax having a melting point in the range of from about 118° F. to about 140° F., from about 15% to about 30% of a microcrystalline wax having a melting point in the range of from about 120° F. to about 200° F., from about 60% to about 85% of a highly refined white mineral oil having a viscosity in the range of from about 55 to about 350 S. S. U., and from about 1% to about 15% of water, the ratio of said microcrystalline wax to said paraffin wax being at least about 2:1.

2. The emulsified trough grease composition of claim 1 which includes from about 0.005% to about 0.5% of an edible, non-toxic emulsifying agent.

3. The emulsified trough grease composition of claim 1 which includes from about 0.001% to about 0.2% of sorbitan sesquioleate.

4. The method of preparing an opaque, high melting, petroleum trough grease which is stable at high ambient temperatures which method comprises forming an admixture comprising from about 1% to about 15% of a paraffin wax having a melting point in the range of from about 118° F. to about 140° F., from about 15% to about 30% of a microcrystalline wax having a melting point in the range of from about 120° F. to about 200° F., from about 60% to about 85% of a highly refined white mineral oil having a viscosity in the range of from about 55 to about 350 S. S. U., and from about 1% to about 15% of water, the ratio of said microcrystalline wax to said paraffin wax being at least about 2:1, heating the mixture to a temperature not exceeding the melting point of said microcrystalline wax for a sufficient period of time to liquify the mixture and cooling the resulting emulsion to a non-liquid state.

References Cited in the file of this patent

UNITED STATES PATENTS

| | | |
|---|---|---|
| 2,387,157 | Koppenhoefer | Oct. 16, 1945 |
| 2,402,373 | Cordero | June 18, 1946 |
| 2,455,820 | Steiner | Dec. 7, 1948 |
| 2,509,786 | Schiermier et al. | May 30, 1950 |
| 2,559,481 | Truesdell et al. | July 3, 1951 |
| 2,575,874 | Herlow | Nov. 20, 1951 |
| 2,595,158 | McCue | Apr. 29, 1952 |

FOREIGN PATENTS

| | | |
|---|---|---|
| 539,049 | Great Britain | Aug. 26, 1941 |